United States Patent
Chiu et al.

(10) Patent No.: US 8,379,170 B2
(45) Date of Patent: Feb. 19, 2013

(54) METHODS FOR MANUFACTURING PIXEL UNIT, LIQUID CRYSTAL DISPLAY PANEL, AND ELECTRO-OPTICAL APPARATUS

(75) Inventors: Chung-Hsiang Chiu, Hsinchu (TW); Ching-Huan Lin, Hsinchu (TW); Sung-Kao Liu, Hsinchu (TW); Yue-Shih Jeng, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 161 days.

(21) Appl. No.: 13/104,013

(22) Filed: May 9, 2011

(65) Prior Publication Data

US 2011/0212393 A1 Sep. 1, 2011

Related U.S. Application Data

(62) Division of application No. 12/111,212, filed on Apr. 29, 2008, now Pat. No. 7,969,535.

(30) Foreign Application Priority Data

Feb. 26, 2008 (TW) ................................ 97106634 A

(51) Int. Cl.
*G02F 1/1335* (2006.01)
*G02F 1/1337* (2006.01)
(52) U.S. Cl. ..................... 349/104; 349/129; 204/192.26
(58) Field of Classification Search .................. 349/104, 349/129; 204/192.26
See application file for complete search history.

(56) References Cited

U.S. PATENT DOCUMENTS

| 6,517,687 | B1 | 2/2003 | Iacovangelo | |
| 6,950,172 | B2* | 9/2005 | Hattori et al. | 349/191 |
| 6,969,654 | B1 | 11/2005 | Pham et al. | |
| 8,085,373 | B2* | 12/2011 | Chida et al. | 349/124 |
| 2006/0109406 | A1* | 5/2006 | Sasabayashi et al. | 349/129 |

FOREIGN PATENT DOCUMENTS

TW 562960 11/2003

OTHER PUBLICATIONS

"Office Action of Taiwan Counterpart Application", issued on Dec. 21, 2011, p. 1-p. 6.

* cited by examiner

*Primary Examiner* — Huyen Ngo
(74) *Attorney, Agent, or Firm* — Jianq Chyun IP Office

(57) ABSTRACT

A pixel unit having a display area is provided. The pixel unit includes a first substrate, a second substrate, a liquid crystal layer, and at least one ultraviolet light (UV) absorption pattern. The second substrate is disposed in parallel to the first substrate, and the liquid crystal layer is disposed between the first substrate and the second substrate. The UV absorption pattern is disposed between the first substrate and the second substrate. A part of the display area overlaps the UV absorption pattern to define at least one first alignment area, while the part of the display area which does not overlap the UV absorption pattern defines at least one second alignment area. The liquid crystal molecules of the liquid crystal layer present different pre-tilt angles in the first alignment area and the second alignment area.

8 Claims, 9 Drawing Sheets

METHODS FOR MANUFACTURING PIXEL UNIT, LIQUID CRYSTAL DISPLAY PANEL, AND ELECTRO-OPTICAL APPARATUS

CROSS-REFERENCE TO RELATED APPLICATION

This is a divisional application of and claims the priority benefit of a prior application Ser. No. 12/111,212, filed on Apr. 29, 2008, now allowed. The prior application Ser. No. 12/111,212 claims the priority benefit of Taiwan application serial no. 97106634, filed on Feb. 26, 2008. The entirety of each of the above-mentioned patent applications is hereby incorporated by reference herein and made a part of this specification.

BACKGROUND OF THE INVENTION

1. Field of the Invention

The present invention generally relates to a pixel unit, a liquid crystal display (LCD) panel, an electro-optical apparatus, and methods for manufacturing the same and, more particularly, to a pixel unit, a LCD panel, and an electro-optical apparatus having wide viewing angle and methods for manufacturing the same.

2. Description of Related Art

Presently, the design of thin film transistor liquid crystal display (TFT-LCD) panel is going toward high contrast ratio, no gray scale inversion, little color shift, high luminance, high color richness, high color saturation, quick response, and wide viewing angle. Techniques for providing a LCD panel with wide viewing angle include twisted nematic (TN) LCD panel with wide viewing film, in-plane switching (IPS) LCD panel, fringe field switching (FFS) LCD panel, and multi-domain vertical alignment (MVA) TFT-LCD panel etc.

Wide viewing angle display can be achieved in a LCD panel through foregoing techniques. However, the gamma curve of the images displayed by a conventional LCD panel presents different curvature at different viewing angle. Thus, when the viewing angle changes, the display brightness presented by the conventional LCD panel also changes, and accordingly the problem of color shift or color washout may be produced.

Many conventional techniques have been provided for resolving the problem of color shift. According to one of the conventional techniques, an extra capacitor is disposed in a single pixel unit, so that different electric fields can be produced by different pixel electrodes in the single pixel unit through the capacitance coupling effect. As a result, the liquid crystal molecules above different pixel electrodes in the single pixel unit can present different arrangements and accordingly different display brightness is shown. Even though the problem of color shift can be resolved through this technique, the display quality of the pixel unit is reduced due to the RC delay effect.

According to another conventional technique, an additional transistor is further disposed in each pixel unit, namely, a single pixel unit has two transistors. These two transistors allow two pixel electrodes in a single pixel unit to present different display voltages, so that the liquid crystal molecules above different pixel electrodes can have different arrangements and accordingly the problem of color shift can be resolved. However, more scan lines or data lines have to be disposed in a LCD panel in order to dispose two transistors in a single pixel unit. As a result, the complexity of the driving circuit is increased and the display aperture ratio of the LCD panel is reduced.

SUMMARY OF THE INVENTION

Accordingly, the present invention is directed to a pixel unit and a method for manufacturing the same, wherein the problem of color shift presented by the pixel unit at large viewing angle is resolved.

The present invention is also directed to a liquid crystal display (LCD) panel and a method for manufacturing the same, wherein the problem of color shift is resolved through a simple design.

The present invention is further directed to an electro-optical apparatus and a method for manufacturing the same, wherein the electro-optical apparatus has high display aperture ratio and simple circuit layout.

The present invention provides a pixel unit having a display area. The pixel unit includes a first substrate, a second substrate, a liquid crystal layer, and at least one ultraviolet light (UV) absorption pattern. The second substrate is disposed in parallel to the first substrate, and the liquid crystal layer is disposed between the first substrate and the second substrate. The UV absorption pattern is disposed between the first substrate and the second substrate. A part of the display area overlaps the UV absorption pattern to define at least one first alignment area, and the part of the display area which does not overlap the UV absorption pattern defines at least one second alignment area. The liquid crystal molecules of the liquid crystal layer present different pre-tilt angles in the first alignment area and the second alignment area.

According to an embodiment of the present invention, the pixel unit further includes a polymer layer disposed on at least one of a part of the first substrate and a part of the second substrate. The polymer layer is directly contacted with the liquid crystal layer, so that the liquid crystal molecules of the liquid crystal layer can present different pre-tilt angles in the first alignment area and the second alignment area.

According to an embodiment of the present invention, the first substrate further includes at least one dielectric layer and at least one common electrode, and the common electrode is disposed between the dielectric layer and the liquid crystal layer. For example, the UV absorption pattern may be located between the dielectric layer and the common electrode, or the dielectric layer may be located between the UV absorption pattern and the common electrode.

According to an embodiment of the present invention, the second substrate includes at least one pixel electrode, and where the pixel electrode is located defines the display area. The second substrate further includes at least one dielectric layer, and the pixel electrode is disposed between the dielectric layer and the liquid crystal layer. The UV absorption pattern is located between the dielectric layer and the pixel electrode, or the dielectric layer is located between the UV absorption pattern and the pixel electrode. Substantially, the second substrate, for example, may further include at least one scan line, at least one data line, and at least one active device, wherein the data line intersects the scan line, the active device is electrically connected to the scan line and the data line, and the pixel electrode is electrically connected to the active device.

According to an embodiment of the present invention, a ratio of the surface area of the first alignment area to the total surface area of the first alignment area and the second alignment area is substantially greater than 0 and substantially less than 1.

According to an embodiment of the present invention, the material of the UV absorption pattern includes at least one UV absorption material and at least one solvent, or at least one UV absorption material.

The present invention also provides a LCD panel including foregoing pixel unit.

The present invention further provides an electro-optical apparatus including foregoing LCD panel.

The present invention provides a method for manufacturing a pixel unit. The manufacturing method includes: providing a pixel unit having a display area; and providing a UV light, wherein the UV light irradiates the liquid crystal layer from a side of the UV absorption pattern away from the liquid crystal layer so that the liquid crystal molecules of the liquid crystal layer present different pre-tilt angles in the first alignment area and the second alignment area.

According to an embodiment of the present invention, the method for manufacturing the pixel unit further includes producing at least one voltage difference between the first substrate and the second substrate; and after that, providing the UV light under this voltage difference, wherein the UV light irradiates the liquid crystal layer from the side of the UV absorption pattern away from the liquid crystal layer so that the liquid crystal molecules of the liquid crystal layer can present different pre-tilt angles in the first alignment area and the second alignment area.

According to an embodiment of the present invention, the method for manufacturing the pixel unit further includes mixing a plurality of polymerize-able molecules into the liquid crystal layer, wherein the polymerize-able molecules form a polymer layer on at least one of a part of the first substrate and a part of the second substrate after the UV light irradiates the liquid crystal layer. The polymer layer is directly contacted with the liquid crystal layer, so that the liquid crystal molecules of the liquid crystal layer can present different pre-tilt angles in the first alignment area and the second alignment area.

According to an embodiment of the present invention, the method for manufacturing the pixel unit further includes forming at least one dielectric layer and at least one common electrode on the first substrate, so that the common electrode is located between the dielectric layer and the liquid crystal layer.

According to an embodiment of the present invention, the method for manufacturing the pixel unit further includes forming at least one pixel electrode and at least one dielectric layer on the second substrate, so that the pixel electrode is located between the dielectric layer and the liquid crystal layer.

According to an embodiment of the present invention, the method for manufacturing the pixel unit further includes forming at least one scan line, at least one data line, and at least one active device on the second substrate, so that the data line intersects the scan line, the active device is electrically connected to the scan line and the data line, and the pixel electrode is electrically connected to the active device.

The present invention further provides a method for manufacturing a LCD panel, and the manufacturing method of the LCD panel includes foregoing manufacturing method of the pixel unit.

The present invention also provides a method for manufacturing an electro-optical apparatus, and the method for manufacturing the electro-optical apparatus includes foregoing method for manufacturing the LCD panel.

According to the present invention, a UV absorption pattern is disposed in a pixel unit of a LCD panel, so that when a polymer layer is formed in the pixel unit for aligning the liquid crystal molecules, the disposition of the UV absorption pattern allows the polymer layer in different areas to present different states. Thus, in the LCD panel and the pixel unit provided by the present invention, the liquid crystal molecules of a liquid crystal layer can present different pre-tilt angles in different areas, and as a result, the problem of color shift at large viewing angles, for example, an angle substantially greater than or substantially equal to 60° can be resolved. When the LCD panel and the pixel unit in the present invention are applied to an electro-optical apparatus, the display quality of the electro-optical apparatus can be improved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
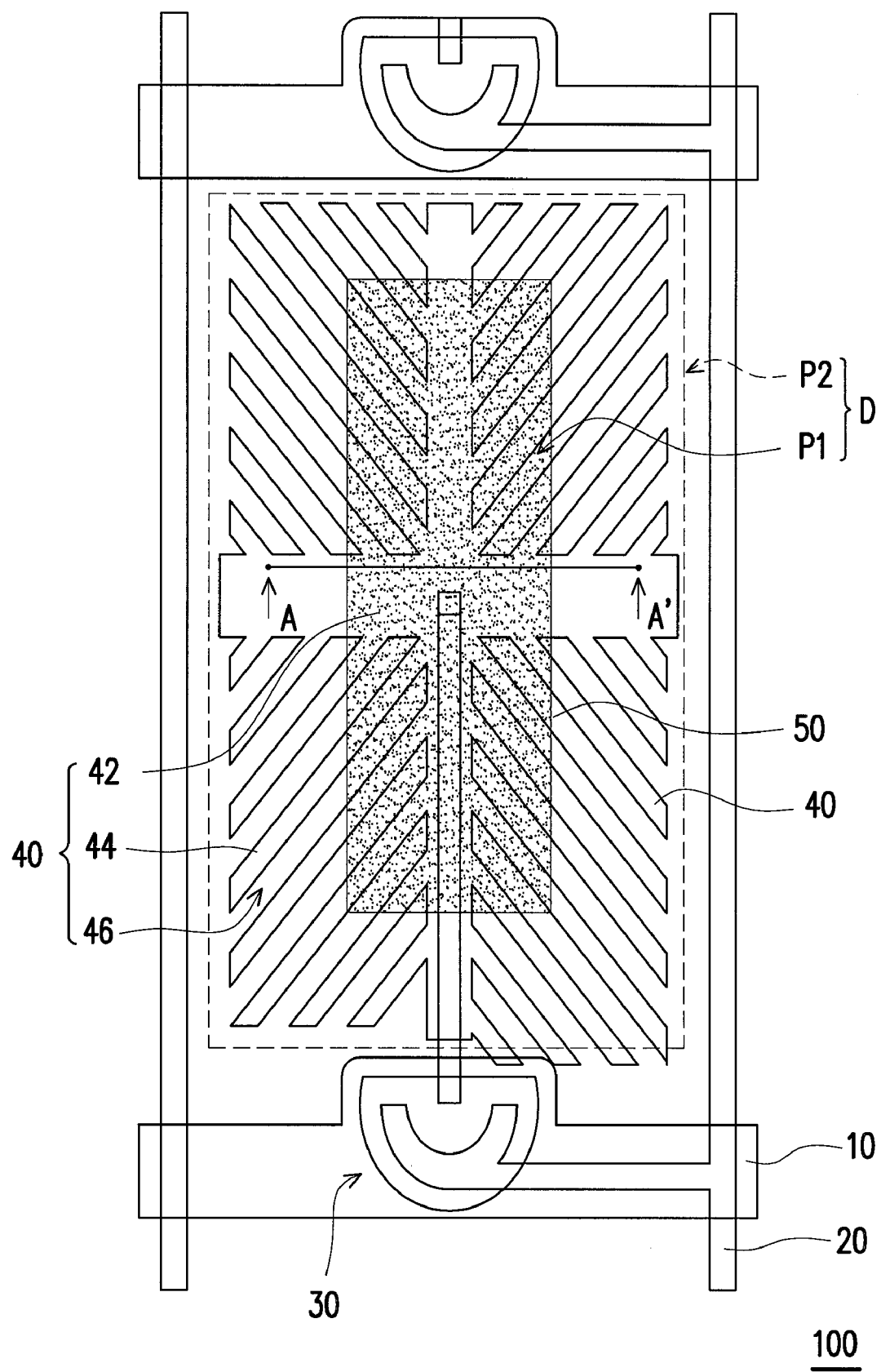
FIG. 1A is a top view of a pixel unit according to one embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

In order to resolve the problem of color shift at large viewing angles, for example, an angle substantially greater than or substantially equal to 60° presented by a liquid crystal display (LCD) panel, the liquid crystal molecules in a single pixel unit have to be able to present different arrangements so as to present different display brightness. Conventionally, this purpose is achieved through the capacitance coupling effect or by disposing additional transistors. However, by using these conventional methods, the display aperture ratio of the LCD panel is affected and the complexity in driving the LCD panel is increased.

Accordingly, the present invention provides a pixel unit, wherein an ultraviolet light (UV) absorption pattern is disposed in the pixel unit so as to form a plurality of alignment areas, and liquid crystal molecules in different alignment areas present different pre-tilt angles. When the pixel unit displays an image, since the threshold voltages adapted to drive the liquid crystal molecules arranged in different pre-tilt angles are different, different alignment areas can present different display brightness and accordingly color shift at large viewing angles can be compensated. According to the present invention, the pixel unit has a display area, and the pixel unit includes a first substrate and a second substrate disposed in parallel to each other. A liquid crystal layer is disposed between the first substrate and the second substrate. At least one UV absorption pattern is disposed between the first substrate and the second substrate. A part of the display area overlaps the UV absorption pattern to define at least one first alignment area, and the part of the display area which does not overlap the UV absorption pattern defines at least one second alignment area. The liquid crystal molecules of the liquid crystal layer present different pre-tilt angles in the first alignment area and the second alignment area.

Various embodiments of the present invention will be described below with reference to accompanying drawings. However, these embodiments are not intended for limiting the scope of the present invention.

Figure 1B:
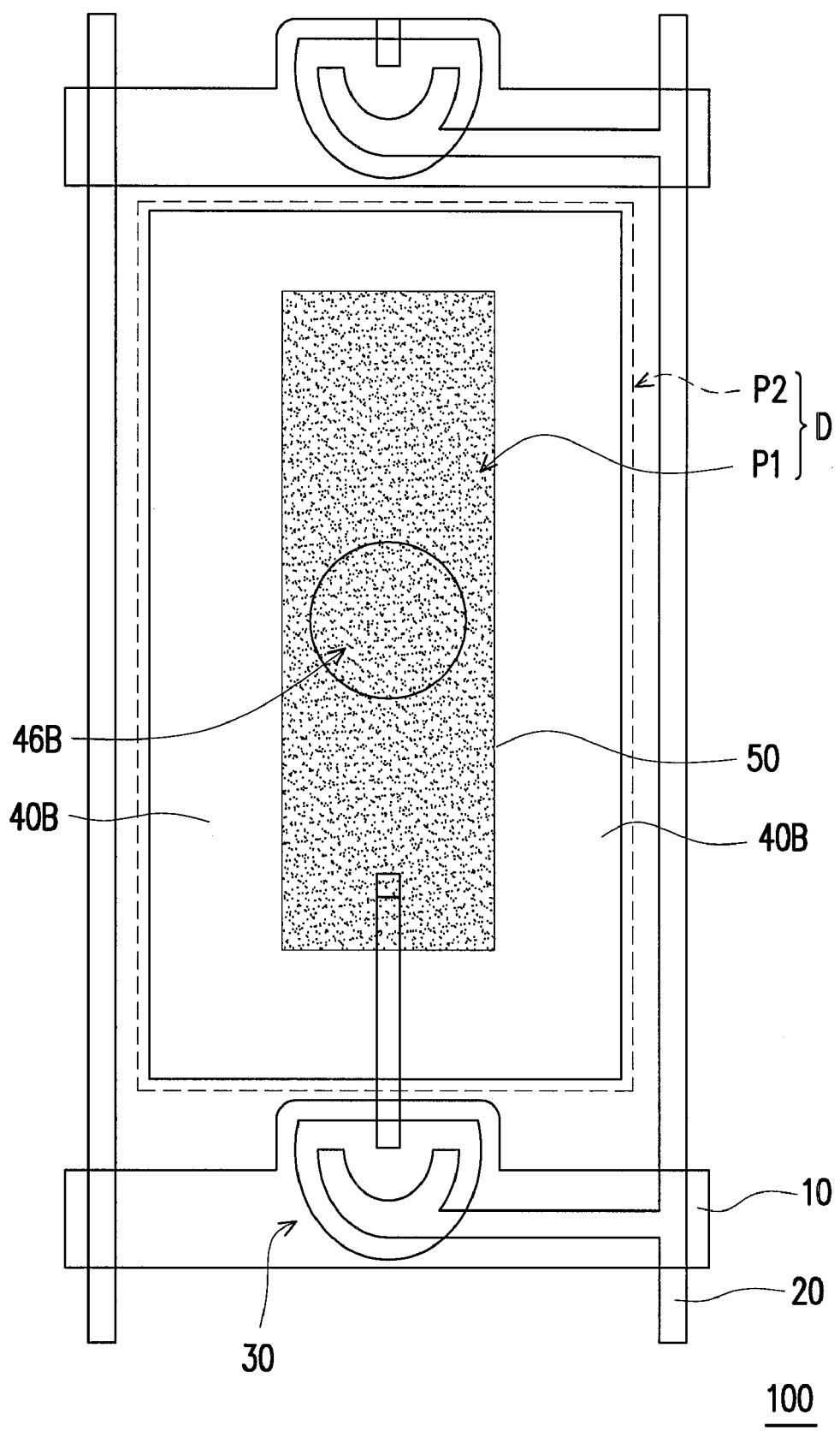
FIGS. 1B~1D are top views of pixel units according to other embodiments of the present invention.
Figure 1C:
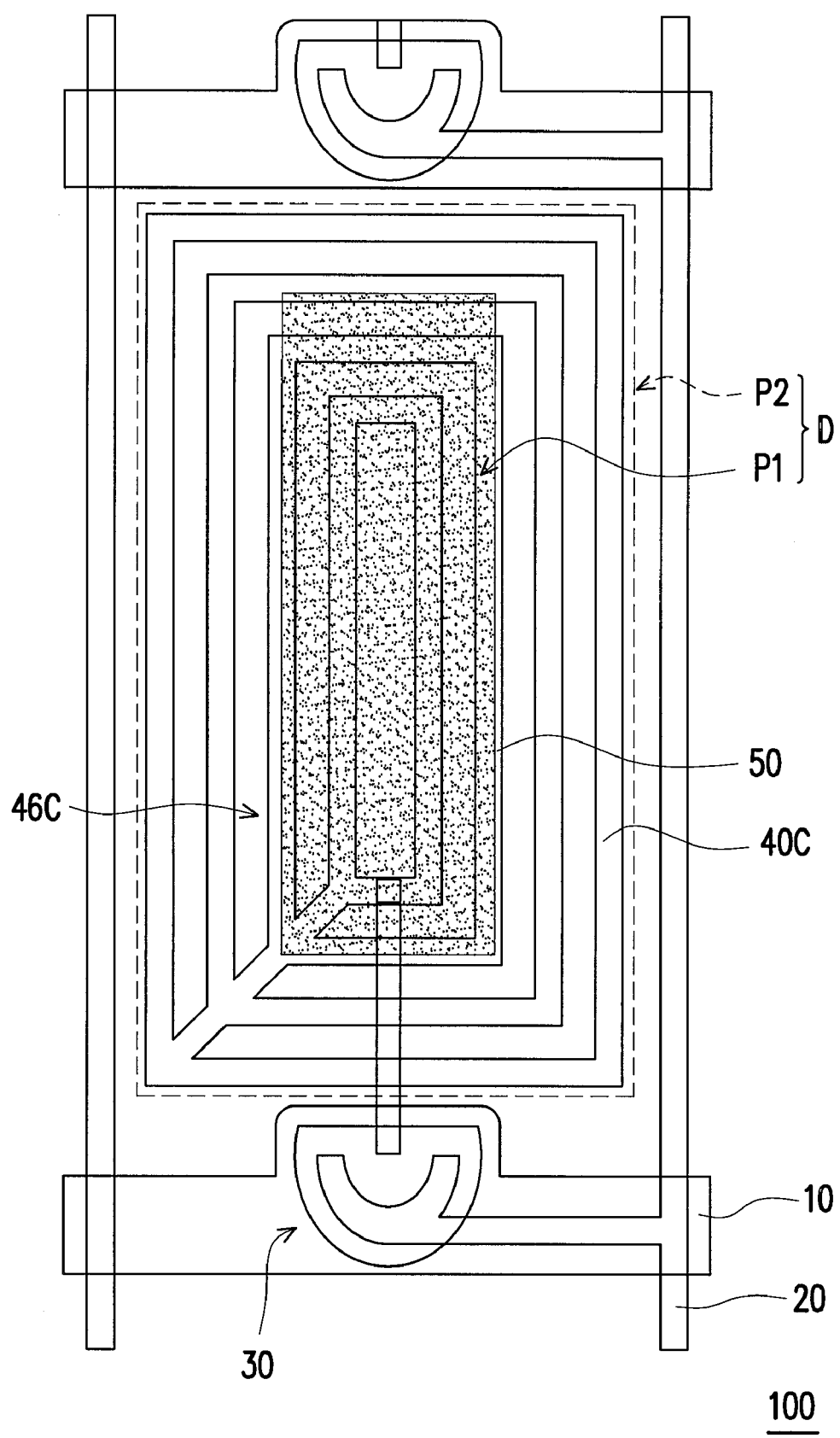
Figure 1D:
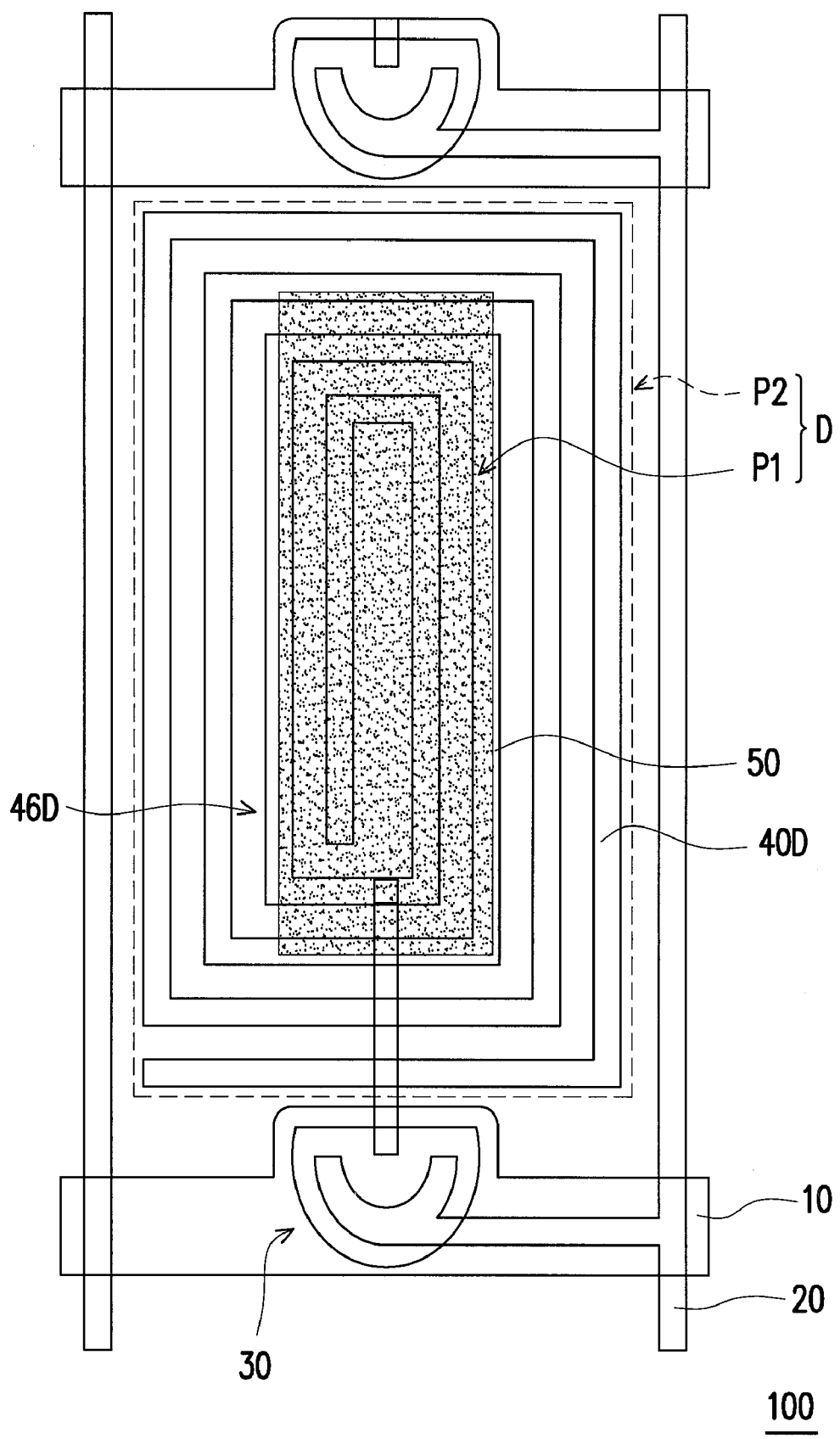
Figure 1E:
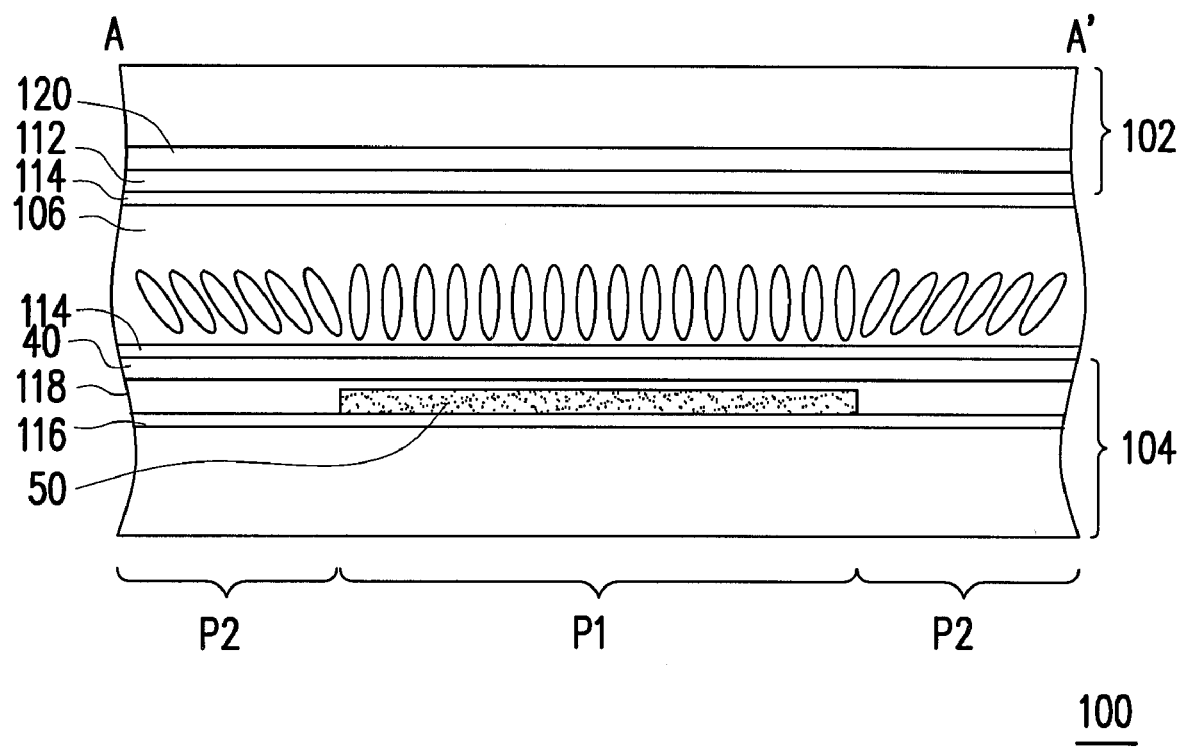
FIG. 1E is a partial cross-sectional view of the pixel unit in FIG. 1A along line AA'.

FIG. 1A is a top view of a pixel unit according to an embodiment of the present invention, FIGS. 1B~1D are top views of pixel units according to other embodiments of the present invention, and FIG. 1E is a partial cross-sectional view cutting along line AA' of the pixel unit in FIG. 1A. Referring to FIG. 1A, the pixel unit 100 includes at least one scan line 10, at least one data line 20, at least one active device 30, at least one pixel electrode 40, and a UV absorption pattern 50. The pixel electrode 40 is electrically connected to the active device 30, and the active device 30 is electrically connected to the scan line 10 and the data line 20. In other words, the pixel unit 100 in the present embodiment is designed in an active driving mode. In another embodiment of the present invention, the active device 30 may also be eliminated from the pixel unit 100 such that the pixel unit 100 is designed in a passive driving mode.

In the present embodiment, the pixel electrode 40 has a central portion 42 and a plurality of strip portions 44 extended outward from the central portion 42. The central portion 42 is composed of a first section (not shown) and a second section (not shown) which are disposed interlacing, and a plurality of slits 46 is formed between the central portion 42 and the strip portions 44 as an exemplar; however, the present invention is not limited thereto. In the present embodiment, the first section and the second section cross each other perpendicularly to form the central portion 42 as an exemplar; however, the present invention is not limited thereto, and the first section and the second section may also cross each other in any angle except about 0°. When the pixel unit 100 displays an image, only the area of the pixel electrode 40 presents the desired image. Accordingly, the area of the pixel electrode 40 is defined as a display area D. However, the pattern of the pixel electrode 40 illustrated in FIG. 1A is only an embodiment of the present invention but not for limiting the scope of the present invention. For example, the pixel electrode 40B illustrated in FIG. 1B has at least one circular opening 46B; the pixel electrode 40C illustrated in FIG. 1C is composed of at least one frame pattern, wherein a plurality of slits 46C is formed between the frame patterns; the pixel electrode 40D illustrated in FIG. 1D is composed of at least one spiral pattern, wherein a plurality of slits 46D is formed between the spiral patterns; or the pixel electrode 40 may also be in other suitable patterns, such as oval, diamond, triangular, quadrangular, pentagonal, hexagonal, star shape, or other suitable shapes.

Referring to FIG. 1A again, the UV absorption pattern 50 is located in part of the display area D so as to define at least one first alignment area P1 and at least one second alignment area P2. The part of the display area D which overlaps the UV absorption pattern 50 is defined as the first alignment area P1, and the part of the display area D which does not overlap the UV absorption pattern 50 is defined as the second alignment area P2. The ratio of the surface area of the first alignment area P1 to the total surface area of the first alignment area P1 and the second alignment area P2, for example, is substantially greater than 0 and substantially less than 1. In the present embodiment, there is only one UV absorption pattern 50 disposed in the pixel unit 100; however, in another embodiment of the present invention, there may be multiple UV absorption patterns 50 disposed in the pixel unit 100. In the present embodiment, the UV absorption pattern 50 is in a rectangular shape as an exemplar; however, the present invention is not limited thereto, and the UV absorption pattern 50 may also be in triangular, circular, oval, spiral, diamond, quadrangular, pentagonal, hexagonal, star shape, or other suitable shapes. In the present embodiment, as shown in FIG. 1A, the UV absorption pattern 50 is substantially located at the center of the display area D as an exemplar; however, the present invention is not limited thereto, and the UV absorption pattern 50 may also be located at other part of the display area D, such as substantially adjacent to the center, substantially adjacent to a corner, between the first section and the second section, at other suitable locations, or a combination of foregoing locations. As shown in FIG. 1B, the opening 46B of the pixel electrode 40B is preferred overlapped with the UV absorption pattern 50; however, the present invention is not limited thereto, and the opening 46B of the pixel electrode 40B may also be overlapped with part of the UV absorption pattern 50 or not overlapped with the UV absorption pattern 50. As shown in FIGS. 1B~1D, the UV absorption pattern 50 is substantially located at the center of the display area D as an exemplar; however, the present invention is not limited thereto, and the UV absorption pattern 50 may also be located at other part of the display area D, such as substantially adjacent to the center, substantially adjacent to a corner, or at other suitable locations.

Referring to the cross-sectional view illustrated in FIG. 1E, the pixel unit 100 substantially includes a first substrate 102, a second substrate 104, and a liquid crystal layer 106. The second substrate 104 is disposed in parallel to the first substrate 102, and the liquid crystal layer 106 is disposed between the first substrate 102 and the second substrate 104. The UV absorption pattern 50 is also disposed between the first substrate 102 and the second substrate 104. In the present embodiment, the UV absorption pattern 50 is disposed on the second substrate 104 as an exemplar, while the UV absorption pattern 50 may also be disposed on the first substrate 102 in another embodiment of the present invention. Besides, the UV absorption pattern 50 may also be disposed on both the first substrate 102 and the second substrate 104 according to the actual requirement, and here the location of the UV absorption pattern 50 on the first substrate 102 may be partially overlapping with or separating from the location of the UV absorption pattern 50 on the second substrate 104.

It should be mentioned that the liquid crystal molecules of the liquid crystal layer 106 present different pre-tilt angles in the first alignment area P1 and the second alignment area P2. For example, the liquid crystal molecules in the first alignment area P1 are approximately perpendicular to the second substrate 104, and the liquid crystal molecules in the second alignment area P2 are not perpendicular to the second substrate 104. However, the pre-tilt angles presented by the liquid crystal molecules in the first alignment area P1 and the second alignment area P2 are not limited in the present invention, and it complies with the spirit of the present invention as long as the liquid crystal molecules present different pre-tilt angles in the first alignment area P1 and the second alignment area P2.

Referring to both FIG. 1A and FIG. 1E, the first substrate 102 further includes a common electrode 112. When the pixel unit 100 displays an image, the electric field produced between the pixel electrode 40 and the common electrode 112 controls the arrangement of the liquid crystal molecules of the liquid crystal layer 106 so that the desired brightness can be displayed. Taking the pattern of the pixel electrode 40 illustrated in FIG. 1A as an example, when the pixel unit 100 displays an image, the slits 46 deforms the electric field in the liquid crystal layer 106, and the deformed electric field caused by these slits 46 allows the liquid crystal molecules of the liquid crystal layer 106 to be arranged along a direction substantially parallel to the extended direction of the slits 46. In the present embodiment, the slits 46 are extended toward four directions as an exemplarily. Accordingly, when the pixel unit 100 displays an image, the liquid crystal molecules of the liquid crystal layer 106 are also tilted toward these four directions. As a result, the wide viewing angle display effect is achieved. However, in another embodiment of the present invention, the pixel electrode 40 may have a different pattern such that the liquid crystal molecules of the liquid crystal layer 106 can be arranged toward at least two directions, and as a result, the wide viewing angle display effect can be achieved.

In the present embodiment, preferably the pixel unit 100 further includes a polymer layer 114 which is directly contacted with the liquid crystal molecules of the liquid crystal layer 106 as an exemplar. The polymer layer 114 may be formed on at least one of the first substrate 102 and the second substrate, for example, through a photo alignment process. In the present embodiment, the polymer layer 114 is disposed on both the first substrate 102 and the second substrate 104 as an exemplar, while the polymer layer 114 may be disposed on only one of the two substrates 102 and 104 in another embodiment of the present invention.

In the present embodiment, the UV absorption pattern 50 may have a single-layer structure or a multi-layer structure, and the material thereof includes organic materials, inorganic materials, or a combination of organic and inorganic materials. In the present embodiment, the UV absorption pattern 50 preferably is fabricated of at least one organic UV absorption material and at least one solvent as an exemplar; however, the present invention is not limited thereto, and in another embodiment of the present invention, the UV absorption pattern 50 may also be only fabricated of at least one UV absorption material. Organic UV absorption material, for example, may be benzotriazole, benzophenone, methacrylic acid polymer, acrylic acid polymer, polypropylene polymer, polyether, polyketide, polyols, or other suitable materials, or a combination of foregoing materials, wherein the organic UV absorption material can absorb a light (i.e. UV light) having wavelength is substantially less than or substantially equal to 400 nm. Inorganic UV absorption material may be silicon oxide, titanium oxide, silicon nitride, silicon oxynitride, tantalum oxide, hafnium oxide, or other suitable materials, or a combination of foregoing materials, wherein the inorganic UV absorption material can absorb a light (i.e. UV light) having wavelength is substantially less than or substantially equal to 400 nm. While forming the polymer layer 114 through a photo alignment process, the disposition of the UV absorption pattern 50 allows the polymer layer 114 in different alignment areas P1 and P2 to receive different energies. Accordingly, the polymer layer 114 has different molecular structures in different alignment areas P1 and P2, and as a result, the liquid crystal molecules of the liquid crystal layer 106 present different pre-tilt angles in different alignment areas P1 and P2.

Since the threshold voltages for driving the liquid crystal molecules having different pre-tilt angles are different, the first alignment area P1 and the second alignment area P2 present different brightness when the pixel unit 100 displays an image. Accordingly, when the pixel unit 100 is applied in a LCD panel, color shift at large viewing angles, for example, an angle substantially greater than or substantially equal to 60°, presented by the LCD panel can be reduced. Generally speaking, the ratio of the surface area of the first alignment area P1 to the total surface area of the first alignment area P1 and the second alignment area P2, for example, is substantially greater than 0 and substantially less than 1. Based on some experimental results, color shift at large viewing angles can be reduced the most when the ratio of the surface area of the first alignment area P1 to the total surface area of the first alignment area P1 and the second alignment area P2 is about 0.5; however, the ratio is not limited to 0.5 in the present invention.

The UV absorption pattern 50 is not fabricated of a light-shielding material, and accordingly, the display aperture ratio of the pixel unit 100 is not restricted by the UV absorption pattern 50. Compared to the conventional techniques wherein additional capacitors or transistors are disposed, the display aperture ratio of the pixel unit 100 in the present invention is not restricted, and no complicated driving method is required. In short, the pixel unit 100 provided by the present invention has simple driving circuit and good display quality.

In detail, the second substrate 104, for example, may further include a first dielectric layer 116 and a second dielectric layer 118, and the first substrate 102, for example, may further include a third dielectric layer 120. It should be mentioned that the second substrate 104 and the first substrate 102 may not have the dielectric layers at the same time, namely, at least one of the second substrate 104 and the first substrate 102 further has another dielectric layer(s). For example, the first dielectric layer 116 may be a gate insulation layer, and the second dielectric layer 118 may be a passivation layer or a planarization layer. The first dielectric layer 116 and the second dielectric layer 118 may have a single-layer structure or a multi-layer structure, and the first dielectric layer 116 and the second dielectric layer 118 may be fabricated of organic dielectric materials, inorganic dielectric materials, or a combination of organic and inorganic dielectric materials for protecting various conductive elements in the pixel unit 100. Additionally, in the present embodiment, the UV absorption pattern 50 is located between the first dielectric layer 116 and the second dielectric layer 118 as an exemplar. In another embodiment of the present invention, the UV absorption pattern 50 may also be located between the pixel electrode 40 and the second dielectric layer 118 or below the first dielectric layer 116. As a result, the dielectric layers 116 and 118 may be located between the UV absorption pattern 50 and the pixel electrode 40. The common electrode 112, for example, may be disposed between the third dielectric layer 120 and the liquid crystal layer 106. The third dielectric layer 120 may have a single-layer structure or a multi-layer structure and may be fabricated of inorganic dielectric materials, organic dielectric materials, or a combination of inorganic and organic dielectric materials.

Since the UV absorption pattern 50 can be disposed on the first substrate 102 in other embodiments, the UV absorption pattern 50, for example, may be located between the third dielectric layer 120 and the common electrode 112 or the third dielectric layer 120 may be located between the UV absorption pattern 50 and the common electrode 112. However, the pixel unit 100 may further include a color filter layer (not shown) located on the first substrate 102 or the second substrate 104 so as to allow the pixel unit 100 to present a colourful display. When the color filter layer is located on the second substrate 104, the color filter layer can be integrated with the active device 30 so as to form a color filter on array (COA) structure or array on color filter (AOC) structure. When the color filter layer is located on the first substrate 102, the color filter layer is located below the common electrode 112. Additionally, the color filter layer tilts the visible light and does not affect the UV absorbance of the UV absorption pattern 50.

Figure 2A:
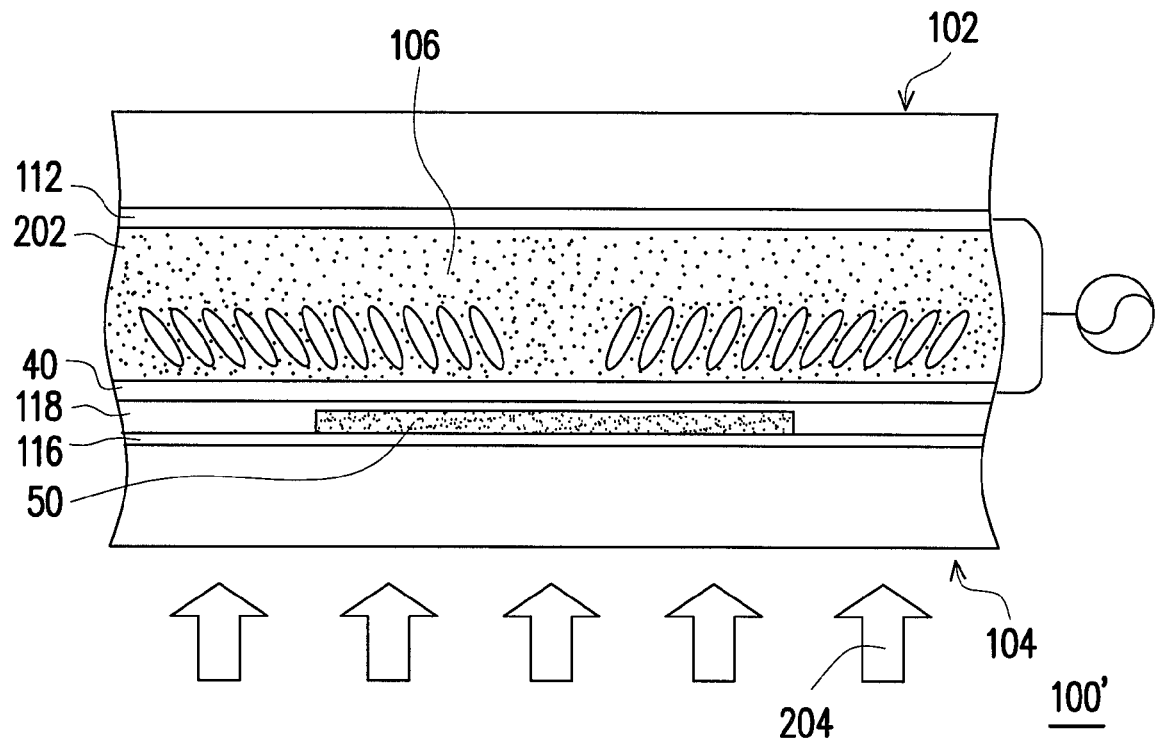
FIG. 2A and FIG. 2B are cross-sectional views illustrating a manufacturing method of the pixel unit in FIG. 1A along line AA'.
Figure 2B:
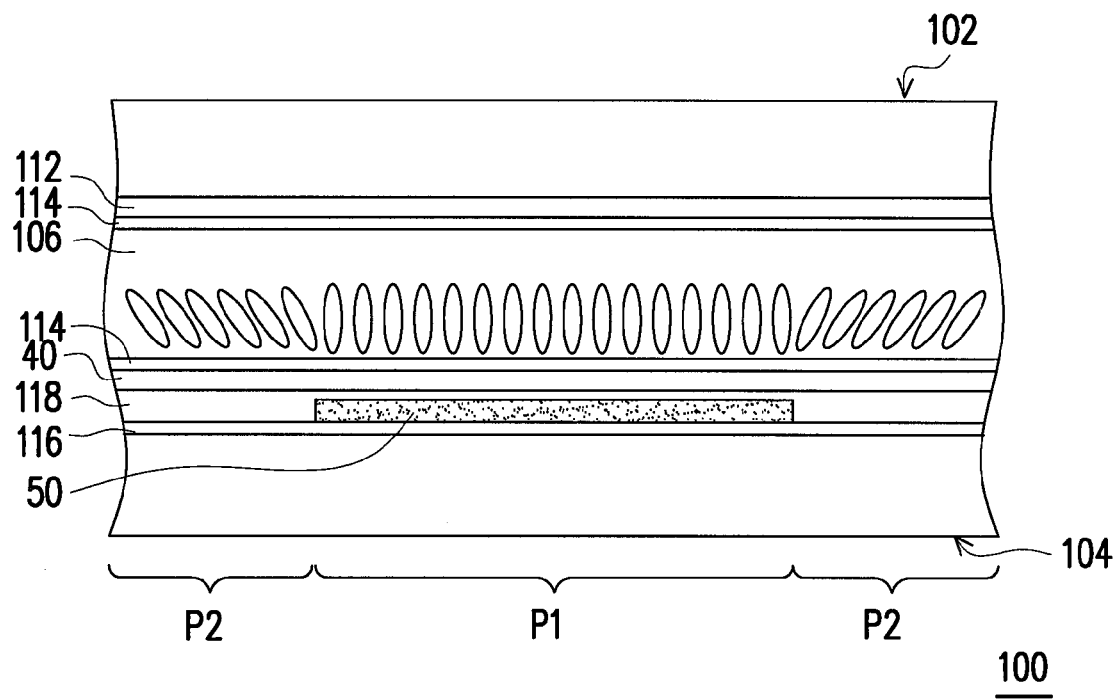

FIG. 2A and FIG. 2B are cross-sectional views illustrating a manufacturing method of the pixel unit in FIG. 1A along line AA'. Referring to FIG. 2A, first, a semi-finished pixel unit 100' is provided. The semi-finished pixel unit 100', for example, may have a structure similar to that of the pixel unit 100 as an exemplar; however, the present invention is not limited thereto. Substantially, those same reference numerals in the semi-finished pixel unit 100' and in the pixel unit 100 refer to the same elements. Additionally, the liquid crystal layer 106 includes a plurality of polymerize-able molecules 202, and these polymerize-able molecules 202, for example, may have photopolymeric characters. Accordingly, the polymerize-able molecules 202 are polymerized and changed, i.e. hardened, once they are irradiated with a light carrying sufficient energy.

Thereafter, in the present embodiment, at least one voltage difference is preferably produced between the first substrate 102 and the second substrate 104. The voltage difference, for example, may be produced by applying different voltages to the pixel electrode 40 and the common electrode 112. Here the liquid crystal molecules of the liquid crystal layer 106 are tilted by the electric field between the first substrate 102 and the second substrate 104. The tilting direction of the liquid crystal molecules illustrated in FIG. 2A is only an example for describing the present embodiment. When the pixel electrode 40 has a pattern as shown in FIG. 1A as an example and the pixel electrode 40 is supplied with a voltage, the liquid crystal molecules of the liquid crystal layer 106 are substantially arranged along the extended direction of the slits 46; however, the pattern of the pixel electrode 40 is not limited thereto.

Next, when the liquid crystal molecules of the liquid crystal layer 106 present a specific arrangement under the electric field, i.e. the voltage difference, at least one UV light 204 is provided for irradiating the liquid crystal layer 106 from a side of the UV absorption pattern 50 away from the liquid crystal layer 106. For example, the UV light 204 irradiates the liquid crystal layer 106 from the side of the second substrate 104 away from the liquid crystal layer 106. The wavelength of the UV light 204 is, for example, about 365 nm, and the energy provided by the UV light 204 is, for example, about 30 J/cm$^2$. However, foregoing wavelength and energy are not intended for limiting the present invention; instead, the UV light 204 may have different wavelength and energy. Referring to both FIG. 2A and FIG. 2B, the polymeric molecules 202 produce polymerization reaction and form a polymer layer 114 at least one side of the liquid crystal layer 106 after they receive the UV light 204. Foregoing steps can be substantially referred as a photo alignment process.

In the present embodiment, the UV absorption pattern 50 is disposed on the second substrate 104, so that the UV light 204, for example, irradiates the liquid crystal layer 106 from the outside of the second substrate 104. In other words, part of the UV light 204 irradiates the UV absorption pattern 50 first before it irradiates the liquid crystal layer 106, and this part of the UV light 204 is absorbed by the UV absorption pattern 50 so that the UV light 204 cannot completely irradiate the liquid crystal layer 106. As a result, the UV light 204 received by the polymerize-able molecules 202 which are located above the UV absorption pattern 50 carries lower energy, while the UV light 204 received by the polymerize-able molecules 202 which are not located above the UV absorption pattern 50 carries higher energy.

The polymer layer 114 polymerized and changed under different energies may have different molecular structures, so as to define the first alignment area P1 and the second alignment area P2. Actually, the polymer layer 114 located in the second alignment area P2 is formed under higher energy therefore can record the current arrangement of the liquid crystal molecules of the liquid crystal layer 106. After the voltage difference between the first substrate 102 and the second substrate 104 is removed, the liquid crystal molecules in the second alignment area P2 present a specific pre-tilt angle and not perpendicular to the second substrate 104. In addition, since the polymer layer 114 has different molecular structures in the first alignment area P1 and the second alignment area P2, the liquid crystal molecules of the liquid crystal layer 106 in the first alignment area P1 may be arranged perpendicular to the second substrate 104 or present in another specific pre-tilt angle. Thus, the design of the pixel unit 100 is advantageous in the reduction of color shift at wide viewing angles, for example, an angle substantially greater than or substantially equal to 60°. Compared to the conventional techniques for reducing color shift, the pixel unit 100 has higher display aperture ratio and simpler driving method.

In another embodiment of the present invention, the photo alignment process may not include the step of producing a voltage difference between the first substrate 102 and the second substrate 104; instead, different energies or lights having different polarization directions are adopted to allow the polymer layer 114 to have specific molecular structures and so that the liquid crystal molecules of the liquid crystal layer 106 can respectively present different pre-tilt angles in the first alignment area P1 and the second alignment area P2. In other words, the method for making the polymer layer 114 to have different molecular structures in different areas is not limited in the present invention. It should be understood by those having ordinary knowledge in the art that any method which allows the polymer layer 114 to have different molecular structures in different areas can be used as the method for manufacturing the pixel unit in the present invention. Besides, in another embodiment of the present invention, the liquid crystal layer 106 may not be doped with the polymerize-able molecules 202; instead, the first alignment area P1 and the second alignment area P2 may be formed through other methods.

Additionally, the scan line 10, the data line 20, and the active device 30 (for example, a thin film transistor (TFT)) in the pixel unit 100 may be fabricated of light-shielding conductive materials, such as metal. The UV light 204 cannot pass through these elements, so that the polymerize-able molecules 202 cannot produce polymerization reaction above these elements. Thus, the polymer layer 114 cannot be formed above the scan line 10, the data line 20, and the active device 30. In other words, if part of the UV light 204 which irradiates the UV absorption pattern 50 is completely absorbed by the UV absorption pattern 50, the polymer layer 114 cannot be formed above the UV absorption pattern 50.

Figure 2C:
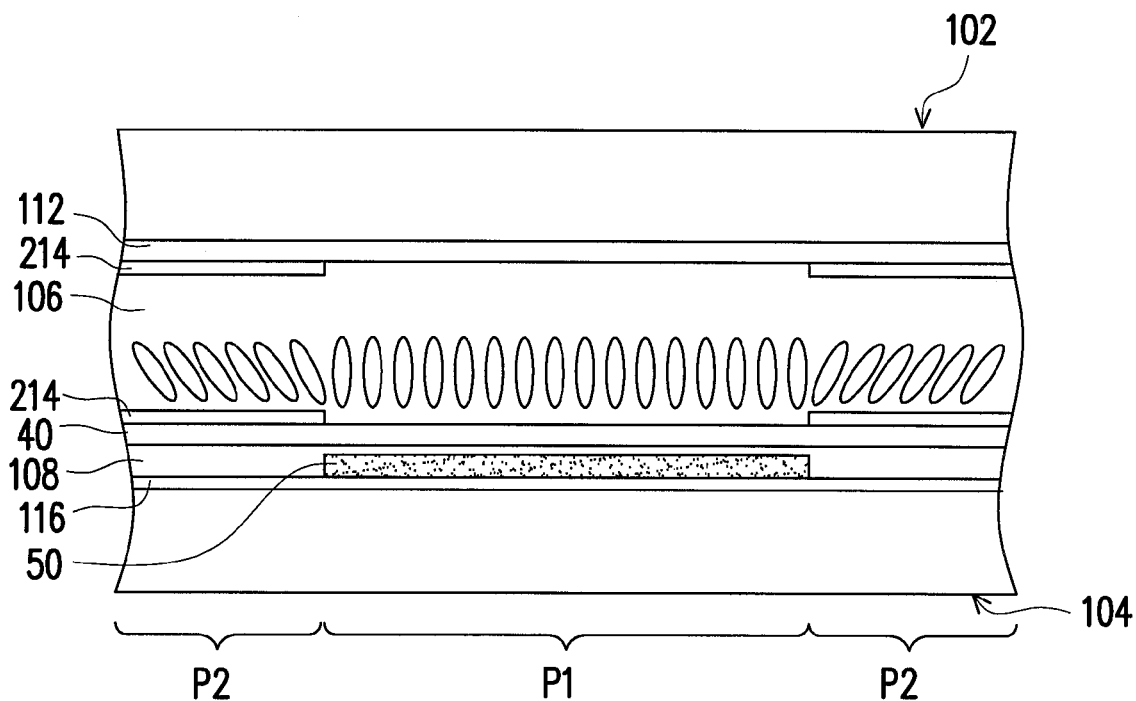
FIG. 2C is a partial cross-sectional view of a pixel unit according to another embodiment of the present invention.

FIG. 2C is a partial cross-sectional view of a pixel unit according to another embodiment of the present invention. Referring to FIG. 2C, the pixel unit 200, for example, may be manufactured through the process illustrated in FIG. 2A therefore has a structure similar to that of the semi-finished pixel unit 100'. The difference between the pixel unit 200 and the semi-finished pixel unit 100' is that the UV absorption pattern 50 can absorb a UV light completely. Since the polymer layer 214 is formed after the polymeric molecules receive a UV light and then are polymerized, the polymer layer 214 cannot be formed in areas which are not irradiated by the UV light during the manufacturing process of the pixel unit 200. In other words, the polymer layer 214 of the pixel unit 200 is only formed in the second alignment area P2. The pre-tilt angle of the liquid crystal molecules of the liquid crystal layer 106 in the first alignment area P1 may be different from that of the liquid crystal molecules of the liquid crystal layer 106 in the second alignment area P2, so that color shift at large viewing angles, for example, an angle substantially greater than or substantially equal to 60° can be compensated. In another embodiment of the present invention, when the polymer layer 214 of the pixel unit 200 is formed in both the first alignment area P1 and the second alignment area P2, preferably, the polymer layer 214 in the first alignment area P1 is substantially thinner than the polymer layer 214 in the second alignment area P2; however, the present invention is not limited thereto.

Figure 3:
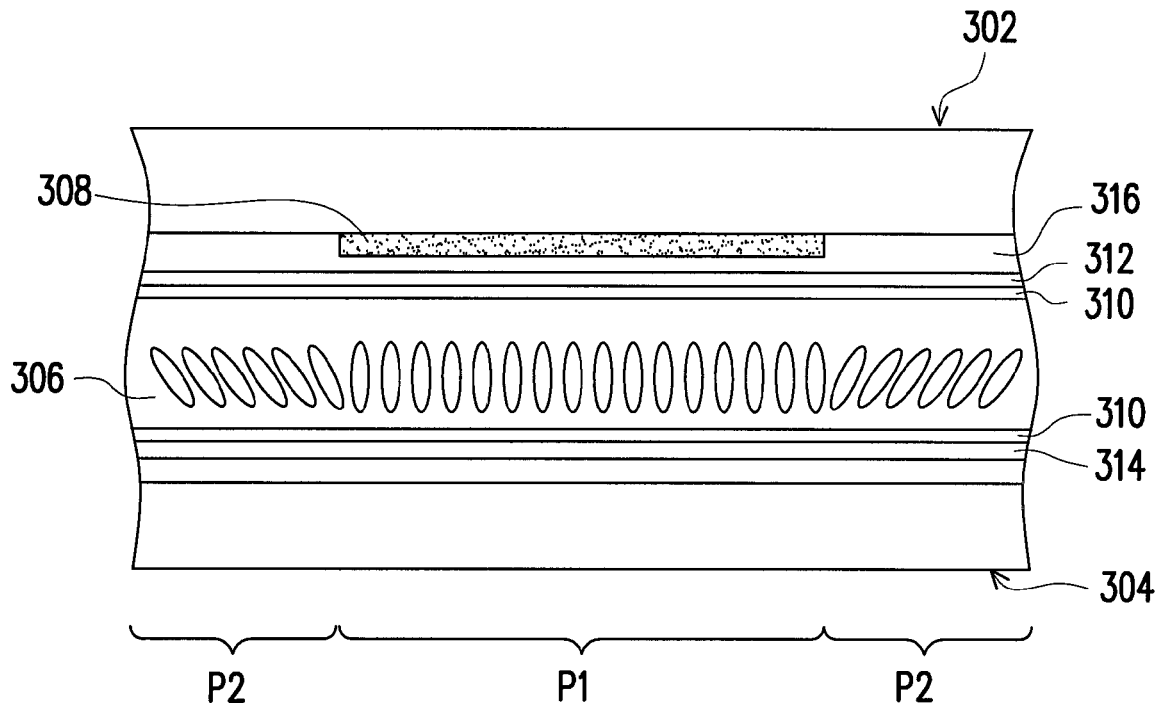
FIG. 3 is a partial cross-sectional view of a display area of a pixel unit according to yet another embodiment of the present invention.

In the embodiments described above, the pixel unit 100 and the pixel unit 200 both have UV absorption patterns 50 disposed on the second substrate 104; however, the present invention is not limited thereto. FIG. 3 is a partial cross-sectional view of a display area of a pixel unit according to yet another embodiment of the present invention. Referring to FIG. 3, the pixel unit 300 includes a first substrate 302, a second substrate 304, a liquid crystal layer 306, and at least one UV absorption pattern 308. The second substrate 304 is disposed in parallel to the first substrate 302, and the liquid crystal layer 306 is disposed between the first substrate 302 and the second substrate 304. The UV absorption pattern 308 is disposed on the first substrate 302. A first alignment area P1 is defined at where the UV absorption pattern 308 is located, and at least one second alignment area P2 is defined by those parts outside of the UV absorption pattern 308. The liquid crystal molecules of the liquid crystal layer 306 present different pre-tilt angles in the first alignment area P1 and the second alignment area P2.

The pixel unit 300 may have a polymer layer 310 located on at least one of the first substrate 302 and the second substrate 304. In the present embodiment, the polymer layer 310 is disposed on both the first substrate 302 and the second substrate 304 as an exemplar. However, in another embodiment of the present invention, the polymer layer 310 may be disposed on only one of the first substrate 302 and the second substrate 304. The polymer layer 310 is formed by polymerizing polymerize-able molecules through a photo alignment process. The disposition of the UV absorption pattern 308 affects the molecular structures of the polymer layer 310 in the first alignment area P1 and the second alignment area P2 so that the liquid crystal molecules of the liquid crystal layer 306 present different pre-tilts angles in the first alignment area P1 and the second alignment area P2.

In the present embodiment, the UV absorption pattern 308 is disposed on the first substrate 302, and accordingly during the photo alignment process, the UV light needs to irradiate the liquid crystal layer 306 from the outside of the first substrate 302. As a result, the UV light with different energies irradiates in the first alignment area P1 and the second alignment area P2, so as to allow the liquid crystal molecules of the liquid crystal layer 306 to present different pre-tilt angles. In another embodiment of the present invention, if the UV absorption pattern 308 is disposed on both the first substrate 302 and the second substrate 304, then during the photo alignment process, the UV light can irradiate the liquid crystal layer 306 from outside of the first substrate 302 and outside of the second substrate 304 simultaneously or un-simultaneously, or the UV light can irradiate the liquid crystal layer 306 from either the outside of the first substrate 302 or the outside of the second substrate 304. Namely, the irradiation direction of the UV light is determined according to the substrate on which the UV absorption pattern 308 is disposed.

Additionally, the pixel unit 300 may have an active driving design or a passive driving design. In the present embodiment, the pixel unit 300 has an active driving design as an exemplar and includes a common electrode 312 and a pixel electrode 314 respectively located on the first substrate 302 and the second substrate 304. The common electrode 312 and the pixel electrode 314 produce at least one electric field between the first substrate 302 and the second substrate 304 for driving the liquid crystal molecules of the liquid crystal layer 306. Besides, at least one dielectric layer 316 is disposed between the UV absorption pattern 308 and the common electrode 312. In another embodiment of the present invention, the UV absorption pattern 308 may also be located between the dielectric layer 316 and the common electrode 312.

The pixel unit 300 may further include a scan line, a data line, and an active device (not shown in FIG. 3). The pixel electrode 314 in the pixel unit 300 has a pattern similar to that of the pixel electrode 40 illustrated in FIG. 1A. Because the liquid crystal molecules of the liquid crystal layer 306 present different pre-tilt angles in the first alignment area P1 and the second alignment area P2, the pixel unit 300 has good display quality. Namely, an image displayed by the pixel unit 300 does not have the problem of color shift at large viewing angles, for example, an angle substantially greater than or substantially equal to 60°.

Figure 4:
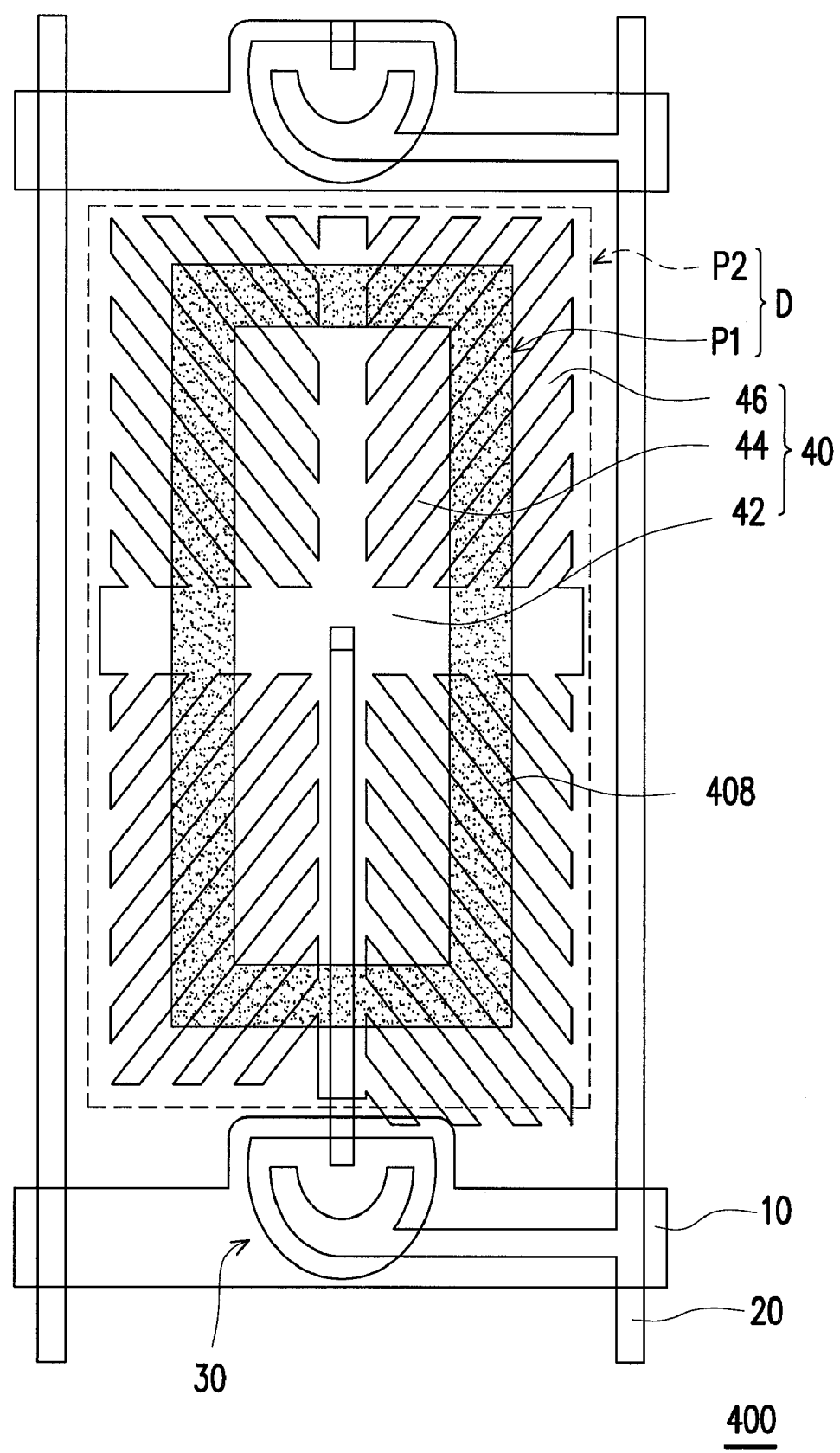
FIG. 4 is a top view of a pixel unit according to still another embodiment of the present invention.

FIG. 4 is a top view of a pixel unit according to still another embodiment of the present invention. Referring to FIG. 4, the elements of the pixel unit 400 are similar to those of the pixel unit 100 in FIG. 1A, wherein only the location of the UV absorption pattern 408 in the pixel unit 400 is different from that of the UV absorption pattern 50 in the pixel unit 100. The display area D of the pixel unit 400 is defined by where the pixel electrode 40 is located. In the present embodiment, for example, the UV absorption pattern 408 has a frame pattern, and the top view thereof is substantially a rectangle. In addition, the pixel electrode 40 has a shape as shown in FIG. 1A as an exemplar; however, the present invention is not limited thereto. In another embodiment of the present invention, the UV absorption pattern 408 may also have triangular, circular, oval, spiral, diamond, quadrangular, pentagonal, hexagonal, star, or other suitable patterns. The UV absorption pattern 408 overlaps a part of the display area D so as to define the first alignment area P1. The part of the display area D which does not overlap the UV absorption pattern 408 defines two second alignment areas P2. Besides, in the present embodiment, there is only one UV absorption pattern 408 as an exemplar; however, the present invention is not limited thereto, and in another embodiment of the present invention, there may also be multiple UV absorption patterns 408.

The pixel unit 400, for example, may further include a liquid crystal layer (not shown) which is served as a display medium. In the present embodiment, the pixel electrode 40 has a plurality of slits 46 which allows the liquid crystal molecules of the liquid crystal layer (not shown) to be arranged toward different directions during displaying. As a result, the wide viewing angle display effect can be achieved in the pixel unit 400. In anther embodiment of the present invention, the pixel electrode may also have at least one circular opening, at least one frame pattern, at least one spiral pattern, or may have other suitable patterns such as oval, diamond, triangular, quadrangular, pentagonal, hexagonal, and star pattern as shown in FIGS. 1B~1D. Besides, as described above, the disposition of the UV absorption pattern 408 affects the energy distribution of the UV light in the alignment areas P1 and P2 during the photo alignment process so that the liquid crystal molecules of the liquid crystal layer (not shown) in the pixel unit 400 can be arranged in different pre-tilt angles in the alignment areas P1 and P2. Accordingly, when the pixel unit 400 displays an image, color shift at large viewing angles, for example, an angle substantially greater than or substantially equal to 60° can be reduced. In short, the display quality of the pixel unit 400 is improved.

In the present embodiment, the ratio of the surface area of the first alignment area P1 to the total surface area of the first alignment area P1 and the two second alignment areas P2 is substantially greater than 0 and substantially less than 1. In other words, in the pixel unit 400, the UV absorption pattern 408 is disposed in at least a part of the display area D so as to resolve the problem of color shift at large viewing angles, for example, an angle substantially greater than or substantially equal to 60°. The location and the pattern of the UV absorption pattern 408 are not limited in the present invention. The UV absorption pattern 408 may also be disposed between any film layers in the display area D of the pixel unit 400. In addition, the disposition of the UV absorption pattern 408 on the first substrate and/or the second substrate, the irradiation direction of the UV light, and the UV absorbance of the UV absorption pattern 408 in the present embodiment can be referred to the embodiment described above.

The pixel units 100, 200, 300, and 400 described above are only examples of the pixel unit provided by the present invention. In the pixel units 100, 200, 300, and 400, the electric fields for driving the liquid crystal layers 106, 306, and 406 may also be produced by a plurality of electrodes disposed on the same substrate. Namely, the pixel unit in the present invention has an in-plane switching (IPS) pixel design. Moreover, in the embodiments described above, the active device 30 is located in a substantially central area as an exemplar; however, the present invention is not limited thereto, and the active device 30 may also be located in other areas.

In the embodiments described above, the tilting direction of the liquid crystal molecules above the scan line 10 and the data line 20 may be ambiguous and accordingly light leakage may be caused. To avoid such light leakage problem, a black matrix (not shown) may be disposed on the first substrate 102 or the second substrate 103 so that the polymerize-able molecules above the black matrix do not produce polymeric reaction and accordingly the polymer layer 114 is not formed; however, the present invention is not limited thereto. The black matrix can be eliminated if there is other element in the pixel unit which can play the same role.

Furthermore, in the embodiments described above, the active device 30 (for example, a TFT) is disposed at one side of the pixel region (for example, close to the central portion of the scan line 10) exemplarily; however, the present invention is not limited thereto, and the active device 30 may also be disposed away from the central portion or in other areas. Besides, the active device 30 has a bottom-gate structure exemplarily; however, the present invention is not limited thereto. The active device 30 may also have a top-gate structure or other suitable structures. Moreover, in the embodiments described above, the irradiation direction of the UV light is substantially perpendicular to a surface of the first substrate and/or the second substrate away from the liquid crystal layer as an exemplar; however, the present invention is not limited thereto, and the irradiation direction of the UV light may also be in a 0~90° angle to the surface. Namely, the irradiation direction of the UV light forms a tilting angle to the surface of the first substrate and/or second substrate away from the liquid crystal layer.

Figure 5:
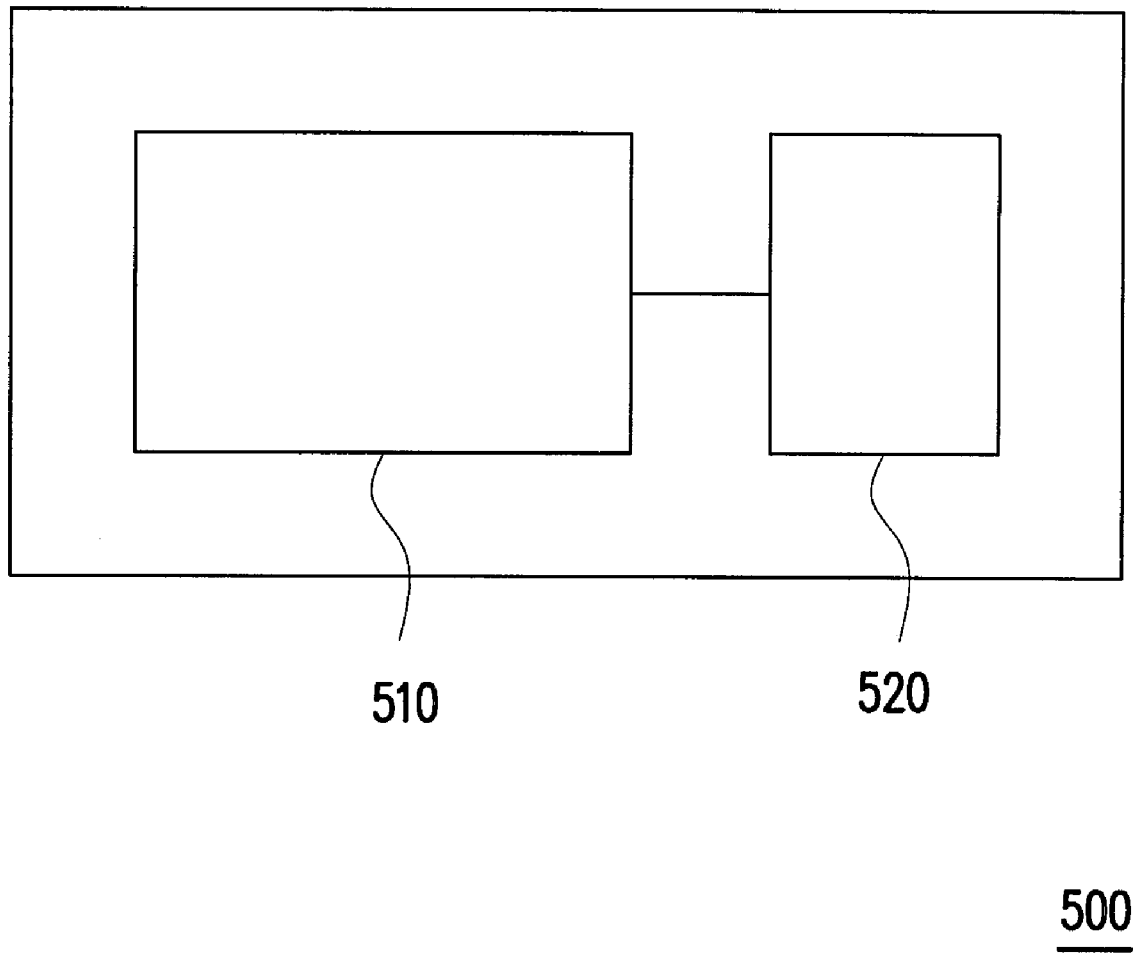
FIG. 5 is a diagram of an electro-optical apparatus according to an embodiment of the present invention.

FIG. 5 is a diagram of an electro-optical apparatus according to an embodiment of the present invention. Referring to FIG. 5, the electro-optical apparatus 500 includes an LCD panel 510 and an electronic device 520 electrically connected to the LCD panel 510. The LCD panel 510 includes at least one of the pixel units 100, 200, 300, and 400 described above. Accordingly, the method for manufacturing the LCD panel 510 includes the method for manufacturing the pixel unit 100, 200, 300, or 400. The pixel units 100, 200, 300, and 400 have good display quality and simple driving method, and accordingly, the electro-optical apparatus 500 also has foregoing advantages. However, the pixel unit in the LCD panel 510 may also be other pixel unit which complies with the concept of the present invention.

Furthermore, the LCD panel 510 can be categorized into many different types of LCD panels according to the display mode, film layer design, and display medium thereof. The most common types of the LCD panel 510 include transmissive display panel, transflective display panel, reflective display panel, COA display panel, AOC display panel, vertical alignment (VA) display panel, IPS display panel, multi-domain vertical alignment (MVA) display panel, twist nematic (TN) display panel, super twist nematic (STN) display panel, patterned-silt vertical alignment (PVA) display panel, super patterned-silt vertical alignment (S-PVA) display panel, advance super view (ASV) display panel, fringe field switching (FFS) display panel, continuous pinwheel alignment (CPA) display panel, axially symmetric aligned micro-cell mode (ASM) display panel, optical compensation banded (OCB) display panel, super in plane switching (S-IPS) display panel, advanced super in plane switching (AS-IPS) display panel, ultra-fringe field switching (UFFS) display panel, polymer stabilized vertical alignment (PSVA) display panel, dual-view display panel, triple-view display panel, three-dimensional display panel, other types of display panels, or a combination of foregoing display panels, and foregoing LCD panels are also referred as non-self-emissive display panels. If the display medium of the LCD panel 510 contains both liquid crystal material and electro-luminescence material, the LCD panel is then referred as a hybrid display panel or a semi-self-emissive display panel. The LCD panel is also referred as a hybrid display panel or a semi-self-emissive display panel if the display medium thereof is a liquid crystal material but an electro-luminescence material is disposed below the pixel region or the display panel.

In addition, the electronic device 520 may be a control device, an operating device, a processing device, an input device, a memory device, a driving device, a light-emitting device, a protecting device, a sensor device, a detecting device, other functional devices, or a combination of foregoing devices. Generally speaking, the electro-optical apparatus 500 may be a portable product (for example, a cell phone, a video camera, a camera, a notebook computer, a game box, a watch, a music player, an e-mail transceiver, a navigator, a digital photo, or similar products), a video/audio product (for example, a video/audio player or similar products), a screen, a TV, a message board, or a projection panel. Besides, the present invention provides a method for manufacturing the electro-optical apparatus which includes the method for manufacturing the LCD panel 510.

In overview, according to the present invention, a UV absorption pattern is disposed in a pixel unit so as to allow the pixel unit to have at least two alignment areas, wherein the liquid crystal molecules of a liquid crystal layer present different pre-tilt angles in the different alignment areas. Since the threshold voltages for driving the liquid crystal molecules having different pre-tilt angles are different, color shift at large viewing angles (for example, an angle greater than or equal to 60°) can be reduced. Moreover, according to the present invention, no additional capacitor or transistor is disposed in the pixel unit so that the display aperture ratio of the pixel unit is not affected and the display quality thereof is improved. Furthermore, when the pixel unit in the present invention is applied to a LCD panel and an electro-optical apparatus, the display quality of the LCD panel and the electro-optical apparatus can also be improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for manufacturing a pixel unit, comprising:
   providing a semi-finished pixel unit having a display area, and the pixel unit comprises:
   a first substrate;
   a second substrate disposed in parallel to the first substrate;
   a liquid crystal layer disposed between the first substrate and the second substrate;
   at least one UV absorption pattern disposed between the first substrate and the second substrate, wherein a part of the display area overlaps the UV absorption pattern to define at least one first alignment area, and the part of the display area which does not overlap the UV absorption pattern defines at least one second alignment area; and
   providing an UV light, wherein the UV light irradiates the liquid crystal layer from a side of the UV absorption pattern away from the liquid crystal layer so that the liquid crystal molecules of the liquid crystal layer present different pre-tilt angles in the first alignment area and the second alignment area.

2. The method according to claim 1, further comprising producing at least one voltage difference between the first substrate and the second substrate, wherein the UV light irradiates the liquid crystal layer from a side of the UV absorption pattern away from the liquid crystal layer under the voltage difference so that the liquid crystal molecules of the liquid crystal layer present different pre-tilt angle in the first alignment area and the second alignment area.

3. The method according to claim 1, further comprising mixing a plurality of polymerize-able molecules into the liquid crystal layer, wherein the polymerize-able molecules form a polymer layer on at least one of a part of the first substrate and a part of the second substrate after the UV irradiates the liquid crystal layer, the polymer layer is directly contacted with the liquid crystal layer, so that the liquid crystal molecules of the liquid crystal layer present different pre-tilt angles in the first alignment area and the second alignment area.

4. The method according to claim 1, further comprising forming at least one dielectric layer and at least one common electrode on the first substrate, so that the common electrode is located between the dielectric layer and the liquid crystal layer.

5. The method according to claim 1, further comprising forming at least one pixel electrode and at least one dielectric layer on the second substrate, so that the pixel electrode is located between the dielectric layer and the liquid crystal layer.

6. The method according to claim 5, further comprising forming at least one scan line, at least one data line, and at least one active device on the second substrate, so that the data line intersects the scan line, the active device is electrically connected to the scan line and the data line, and the pixel electrode is electrically connected to the active device.

7. A method for manufacturing a LCD panel, comprising the method for manufacturing a pixel unit according to claim 1.

8. A method for manufacturing an electro-optical apparatus, comprising the method for manufacturing a LCD panel according to claim 7.

* * * * *